Aug. 30, 1966    C. P. OLSTAD    3,269,278
MULTI-PLY POUCH MANUFACTURING
Filed April 16, 1962    3 Sheets-Sheet 1

INVENTOR.
Carl P. Olstad
BY
Attorneys

Aug. 30, 1966   C. P. OLSTAD   3,269,278
MULTI-PLY POUCH MANUFACTURING
Filed April 16, 1962   3 Sheets-Sheet 2

INVENTOR.
Carl P. Olstad
BY
Attorneys

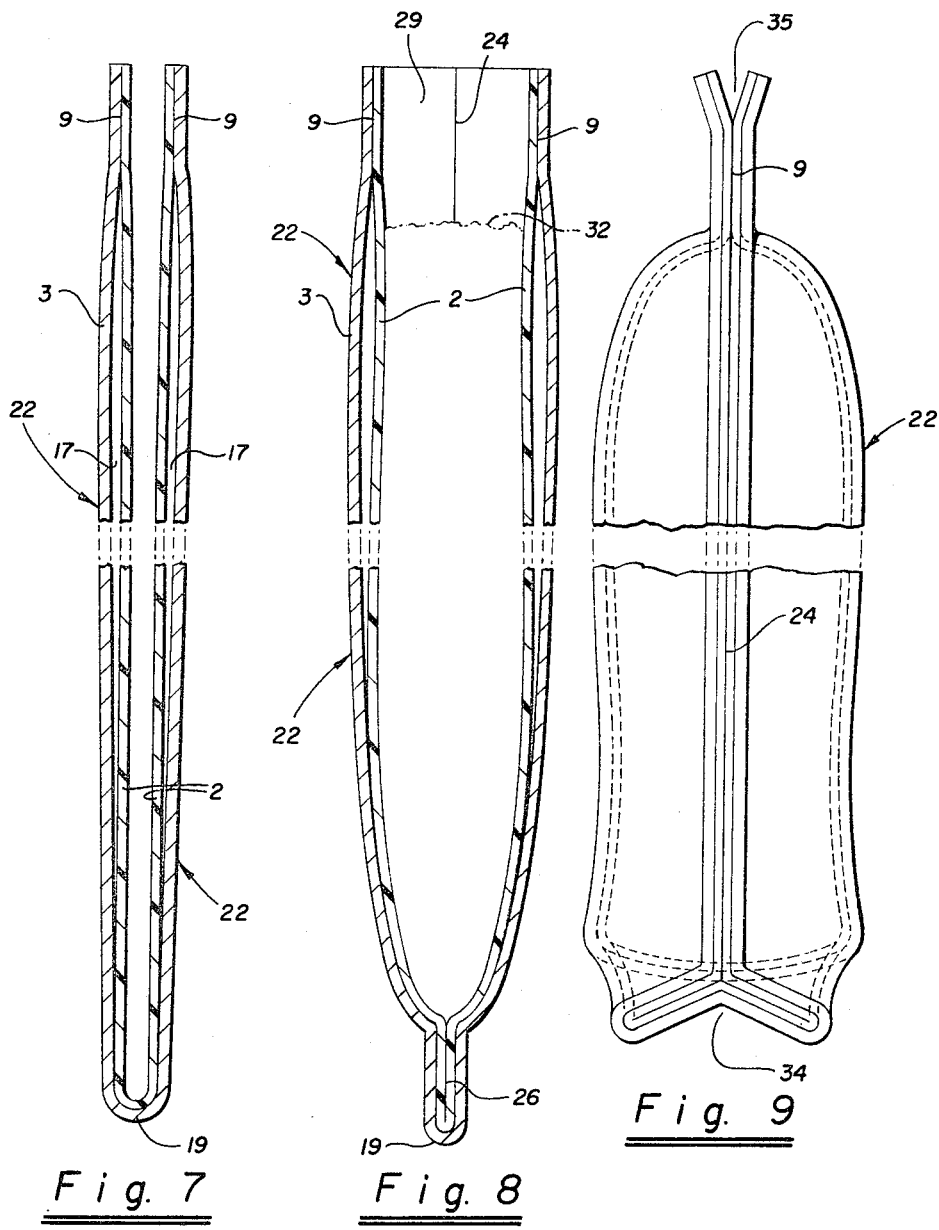

United States Patent Office 3,269,278
Patented August 30, 1966

3,269,278
MULTI-PLY POUCH MANUFACTURING
Carl P. Olstad, Kirkwood, Mo., assignor to Crown Zellerbach Corporation, San Francisco, Calif., a corporation of Nevada
Filed Apr. 16, 1962, Ser. No. 187,723
7 Claims. (Cl. 93—35)

This invention relates to manufacture of pouches and particularly to fin-type pouches adapted for the packaging of various types of food products, such as cake mixes, powdered milk, or the like.

In pouches of the type mentioned, it is desirable that the inside face or surface of the pouch in contact with the food product have a high resistance to penetration of moisture, or in other words, good moisture barrier characteristics, to enhance preservation of the product from the time it is filled into the pouch which is then sealed, until the product containing pouch is sold to the consumer. For this purpose, it is conventional to coat the inside face of the pouch forming stock with a moisture resistant coating or to completely laminate a plastic film or sheet having moisture resistant proporties to such inside face. This type of construction provides a unitary stock sheet which can be readily folded into pouches and filled in conventional fin-type pouch forming and sealing equipment.

For best results, it is desirable that a multi-ply pouch be utilzied having a so-called flexible free inner ply which is substantially free of adherencce to a flexible outer ply between marginal portions which form the boundaries of the pouch. Such arrangement provides an air space or cushion in each wall of the pouch between the inner and outer plies, which serves as a shock absorber and enhances strength. However, problems exist in handling two separate plies and bringing them together to the pouch forming, filling and sealing machine.

The plies which form the respective side walls of the pouch after folding in the machine remain separated at their top edges. Consequently, difficulty exists in filling the open mouth of the pouch as some product flows into the space between the two inner pouch plies; and it is difficult to avoid this by mechanically maintaining the tops of the plies of the respective side walls together to preclude flow of material between them during the filling operation.

Summarizing the present invention, it comprises securing together, desirably by heat sealing heat sealable flexible stock, the top marginal portions of the stock which are to form the respective side walls of the pouch, prior to the filling operation. Thus, no material can flow between the plies of the pouch during the filling operation. After the filling, such top edge or marginal portions of the respective side walls of the pouch are secured together. The edges or margins of all other plies, which are to form the pouch are all sealed or closed in a conventional manner.

Desirably, the inner ply of the pouch is of any suitable heat sealable moisture resistant sheet material, such as any of the well known flexible plastic sheets, advantageously polyolefin film such as polypropylene or polyethylene, and the outer ply is of any suitable flexible stock, such as glassine, paper or aluminum foil, the inside face of which is generally coated with a suitable bonding adhesive.

Such securing together of the plies which are to form the respective side walls of the pouch is advantageously accomplished in a continuous operation by utilizing parent stock sheets which will form the respective inner and outer plies and moving them in one general direction. As they are thus moved, they are continuously united together, desirably by heat sealing, along spaced apart longitudinally extending continuous band portions which are to provide the top of the pouch when the resultant combined multi-ply parent stock is folded along a medial line between such secured portions.

Thus, when the pouch is formed for subsequent filling with product, material can not flow into the space between plies. At the same time, the plies are free of adherence except along marginal edges, to thus provide a so-called free inner ply with an air cushion between the plies of each wall.

From the preceding, it is seen that the invention has as its objects, among others, the provision of an improved method for manufacturing fin-type pouch forming stock, improved method of handling such stock in pouch forming and sealing equipment, and an improved pouch forming pouch stock roll and pouch structure. Other objects will become apparent from the following more detailed description in connection with the accompanying drawings, wherein, FIG. 1 is a schematic isometric view illustrating how individual parent sheets of ply forming stock are brought together, and heat sealed to form multi-ply pouch forming stock in accordance with this invention;

FIG. 7 is an enlarged vertical cross section taken in a plane indicated by line 7—7 in FIG. 4, illustrating the multi-ply pouch forming stock just after folding but prior to pouch formation steps;

FIG. 8 is an enlarged vertical cross section taken in a plane indicated by line 8—8 in FIG. 4, illustrating a completely formed pouch after filling with product and prior to heat sealing of its mouth;

FIG. 9 is an enlarged elevational view looking at a side edge of a filled pouch, illustrating a pouch embodiment with a gusset fold at the bottom.

Although particular types of flexible sheet material to be described later provide most advantageous protection for the packaged product, particularly a food product, any suitable heat sealable flexible sheet material can be utilized for the inner ply 2, desirably a relatively thin heat sealable plastic film, such as polyethylene; and any suitable flexible sheet material can be employed for the outer ply 3, such as paper or metal foil which is desirably coated along its inside face with any suitable heat activatable coating that will enhance adherence to the film.

Figure 1:
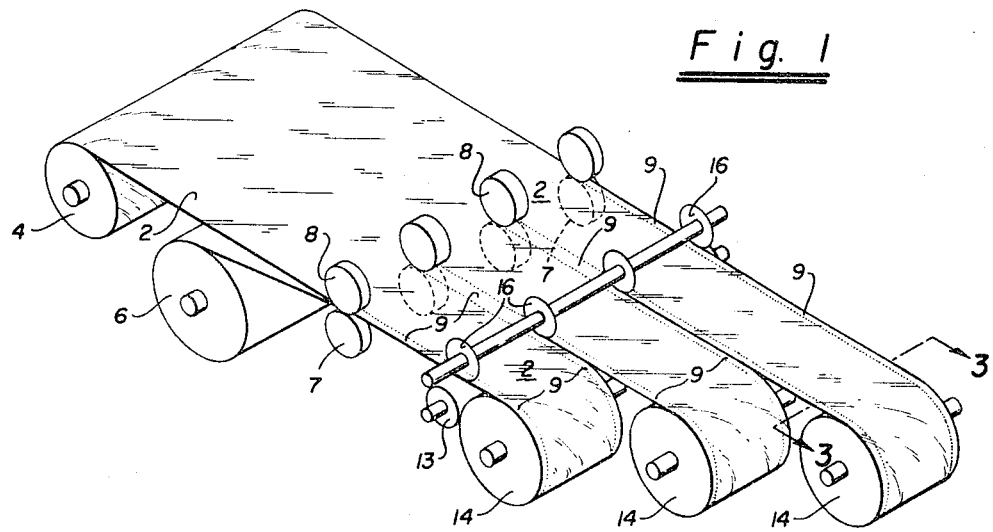
Figure 2:
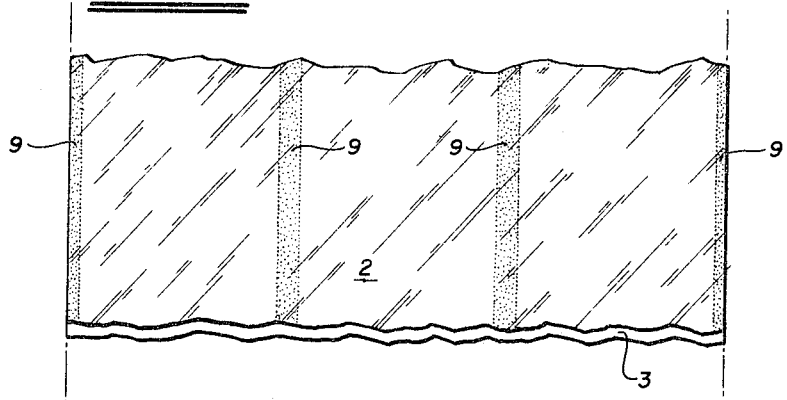
FIG. 2 is an enlarged fragmentary plan view of the multi-ply pouch forming stock as it appears after heat sealing but prior to slitting; the view being at the location indicated by arrow 2 in FIG. 1.

Referring to FIG. 1, the sheets 2 and 3 are respectively continuously unwound by conventional means from parent rolls 4 and 6, respectively, between the nips of laterally spaced sets of cooperating nip rolls 7 and 8 which are desirably driving rolls conventionally spring thrust toward each other. One set of rolls, desirably rolls 7 not in direct contact with the inner ply 2, is heated by any suitable means to heat seal the two plies together along longitudinally spaced apart bands 9 along the outside edges of the parent sheets and intermediate such edges; the bands extending in the direction of movement of the sheets. The intermediate heat sealed bands are wider than those at the edge because they are subsequently slit in two. Such heat sealed bands 9 at the outside edge portions of the sheets and the intermediate bands 9 when slit longitudinally centrally thereof, provide the edge portions which will form the top margins of the pouch in a manner explained hereinafter.

Conventional rotatable slitters 12 cooperable with a bed roll 13 are provided to cut the intermediate bands continuously longitudinally to thus form three independent multi-ply sheets adhesively bonded along side edges 9 and which are continuously rewound in the form of independent or separate rolls 14 with the bonded edges extending transversely to the axis of the roll. These separate rolls 14 provide the master rolls for use in subsequently forming the pouches. Desirably, slitters 16 are employed to even off or trim the outside edges of the parent stock as such edges may not match evenly, although the outside slitters are not essential for the purposes of this invention.

Although two intermediate heat sealed bands 9 are shown which when slit form three separate pouch stock rolls 14, one such band may be utilized or more than two. It is desirable to employ overwide sheets and heat seal at least one such intermediate band and then slit for manufacturing economy. However, insofar as the principle of the invention is concerned, two narrow ply forming sheets may be employed and heat sealed only along their outer edges.

For manufacturing speed and consequent economy, it is advantageous to slit the heat sealed multi-ply sheet in the same operation right after it has been heat sealed along the bands or zones indicated. However, the bonded multi-ply sheet may be heat sealed and wound in a master roll which can be subsequently slit into independent stock rolls at a subsequent time.

Figure 3:
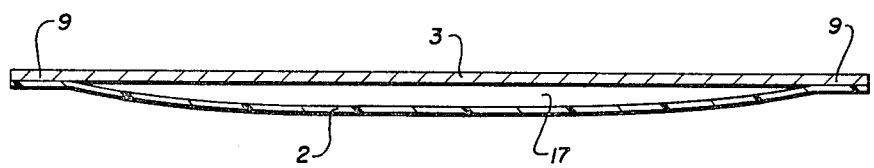
FIG. 3 is an enlarged transverse sectional view taken in a plane indicated by line 3—3 in FIG. 1, but in inverted position for the purpose of showing an air space between the plies more clearly.

As a result of the above described formation of the parent pouch forming multi-ply stock, it will be noted with reference to FIG. 3 that since the inner ply 2 is free of adherence to the outer ply between the marginal portions or edges 9, an air cushoin or pocket 17 exists between such edges. This has been found to enhance protection of the packaged product, and strength of the pouch.

Figure 4:
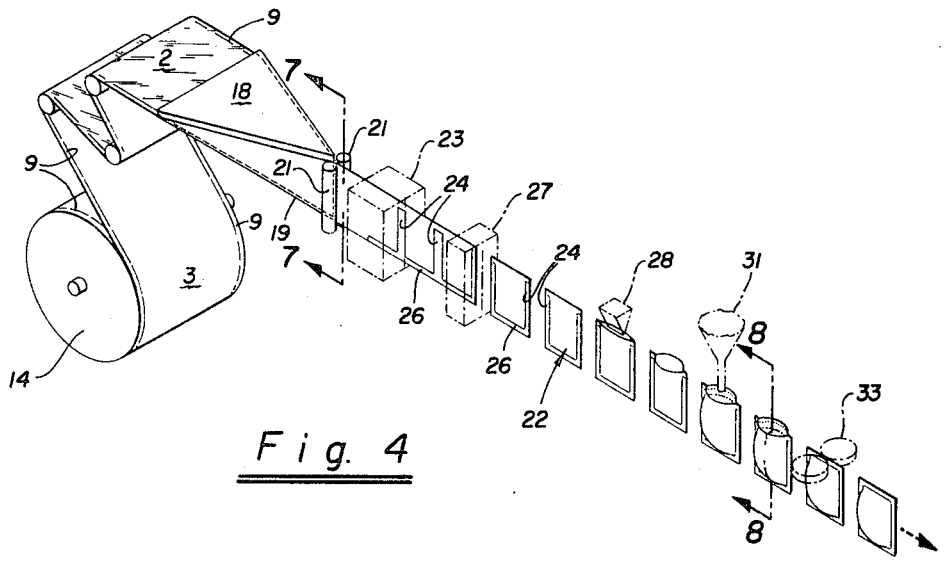
FIG. 4 is a schematic isometric view illustrating how a roll of the pouch forming stock is continuously conducted to conventional elements in a pouch forming and sealing machine in which the pouches are formed and sealed.

Usually, the parent stock rolls 14 are shipped by the manufacturer to the packer for making pouches therefrom, and filling the same. Conventional fin-type pouch forming, filling and sealing apparatus is employed for such purpose. A well known type is the Bartelt machine made by Bartelt Engineering Company, Inc. of Rockford, Illinois. A machine of this character and its operations are illustrated by FIG. 4.

It comprises a wedge shaped former or plow 18 which as the bonded multi-ply sheet is continuously unwound from parent stock roll 14, folds the same in an upright direction longitudinally thereof midway between bonded margins 9 along fold line 19, in cooperation with conventional nip rolls 21 at the narrow end of the plow. FIG. 7 illustrates the multi-ply parent sheet just after it has been folded along fold line 19 from which it will be seen that the inner ply 2 is substantially free from the outer ply 3 but the sides of the molded stock which are to form the opposite side walls 22 of the pouches are completely intergrally bonded together along their top margins 9.

At a later point in the travel of the stock conventional heat sealing mechanism shown in phantom lines at 23 in FIG. 4, seals the stock along spaced apart transversely extending zones 24 which when medially cut, form the sealed side edges or margins of the respective pouches. Desirably, heat sealing is also effected along the fold line 19 to provide a bottom heat sealed edge or margin 26. However, such bottom heat sealing may be omitted if so desired as the pouch stock is completely closed at the bottom as can be seen from FIG. 7.

Conventional slitting means shown in phantom lines at 27 is provided to cut the sealed zones 24 medially thereof to thus form individual pouches which are subsequently separated by speeding up movement of the pouches at this point. After heat sealing and cutting of the folded pouch stock, the pouches have open tops as can be seen from FIG. 8. However, the top margins 9 of the respective side walls 22 of the pouches are securely bonded together thus precluding flow of material between the side wall plies during the subsequent filling operation, and also facilitating opening of such side walls for the filling.

After the described formation of the individual pouches, the top margins of the side walls 22 are separated by a wedge shaped opener shown in phantom lines at 28; and the pouches are now ready for filling through their open tops 29, indicated in FIG. 8. Filling of material into the pouches is effected by conventional filling means including a feed nozzle 31, a portion of which is shown schematically in FIG. 4.

Subsequently, and after the pouches have been filled with product 32, the top edges of the respective side walls 22 are heat sealed together by a suitable heat sealer 38 shown in phantom lines in FIG. 4. If desired, the equipment may omit the filler and the top edge sealer, and pouches with open tops formed in the manner described can be stored in flat condition and then filled at a subsequent time. However, it is customary for the packer to form the pouches and fill in one continuous operation.

FIG. 9 illustrates a pouch construction which is provided with a conventional gusseted bottom and side walls conventionally unsecured for a short distance at the top. If such construction is desired, the equipment can incorporate the usual mechanism for forming a conventional reentrant bottom edge 34 shown in FIG. 9, and also the top margins of the side walls need not be sealed all the way to the top, leaving a space 35 therebetween.

As previously mentioned, any suitable flexible stock may be employed for the outer ply 3 and any suitable flexible stock may also be employed for the inner ply 2 which are adhesively bondable together, desirably by heat sealing. Polyolefin film, such as polyethylene, has been found advantageous for the inner ply 2 because it provides good moisture barrier resistance and is relatively strong. Glassine has been found advantageous for the outer ply 3.

Figure 5:
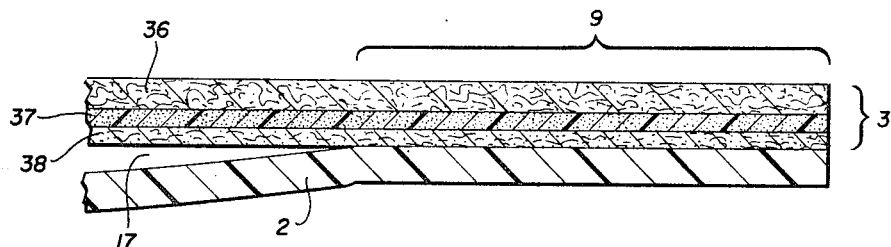
FIG. 5 is an enlarged transverse cross-sectional view, compared to FIG. 3, along one marginal edge of the pouch forming stock, illustrating one embodiment of the outer ply of the multi-ply pouch forming stock.

As polyethylene film does not bond most effectively to glassine, it is desirable to coat one side of the glassine with a heat activatable adhesive readily bondable to polyethylene by heat sealing. Such arrangement is shown in FIG. 5 wherein a glassine sheet 36 of outer ply 3 forms the outer face of such ply and has a wax coating 37 over its inner face to which is laminated a relatively thin paper tissue sheet 38 which forms the inner face of ply 3. The tissue sheet adds strength and serves to prevent blocking by the wax coating when ply 3 is wound into roll 4 and subsequently unwound. When the polyethylene inner ply 2 is heat sealed to the tissue sheet 38 along band portions 9, the heat causes the wax to strike through the tissue and form a firm bond with the polyethylene.

A suitable general combination for the multi-ply stock shown in FIG. 5 based on pounds per ream (3000 sq. ft.) of material is:

*Example I*

| | |
|---|---|
| Glassine, pounds | 15 to 40 |
| Any suitable wax composition, or essentially wax blend, pounds | 5 to 25 |
| Strike through tissue paper, pounds | 7 to 14 |
| Polyethylene film, mil thickness | 0.5 to 3 |

An advantageous preferred combination is:

*Example II*

| | |
|---|---|
| Glassine (opaque), pounds | 22 |
| A blend of 98% by weight microcrystalline wax (M.P. 150/155° F.) and 2% by weight butyl rubber as a tackifier, pounds | 16.5 |
| Strike through tissue paper, pounds | 8.5 |
| Polyethylene film, mil thickness | 2 |

Figure 6:
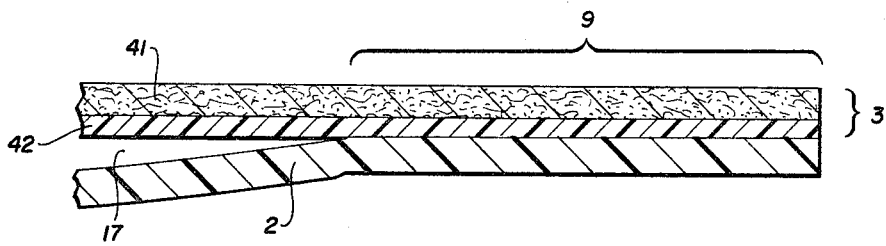
FIG. 6 is a view similar to FIG. 5 illustrating another outer ply embodiment.

Instead of utilizing the wax-strike through tissue to effect a good bond of the polyethylene film to the glassine, the glassine sheet 41 shown in FIG. 6 may be coated directly on its inner face at least along the margins to be heat sealed to the polyethylene film, with any suitable non-blocking heat activatable adhesive coating 42 that will form a good heat sealed adhesive bond between polyethylene and glassine. A suitable adhesive for this purpose is a copolymer of petroleum wax and a resinous copolymer of ethylene and vinyl acetate, such as disclosed in United States Patent No. 2,877,196, dated March 10, 1959, although any other suitable adhesive may be employed. A desirable combination of the type illustrated in FIG. 6 based on pounds per ream is:

*Example III*

| | |
|---|---|
| Glassine, pounds | 22 |
| A blend of vinyl-acetate ethylene copolymer (vinyl acetate content about 28% by weight) 30% by weight; microcrystalline wax (M.P. 150/155° F.) 50% by weight; and paraffin wax (M.P. 143/150° F.) 20% by weight, pounds | 8 |
| Polyethylene film, mils | 2 |

Instead of glassine, kraft paper may be employed for the outer ply 3 or metal foil, such as aluminum foil, and the same heat sealed to the inner polyethylene film 2 in the manner shown in FIG. 6 by means of a heat activatable bonding adhesive desirably of the type described in Example III.

I claim:

1. In the method of manufacturing multi-ply pouches adapted to be filled with a food product in which an inner ply of the pouch is of heat sealable moisture resistant plastic film substantially free of adherence to an outer ply between marginal portions of the pouch, the steps which comprise moving the plies in one general direction, and applying heat sealing rolls for heat sealing together along bands extending in the direction of such movement and prior to the filling of product into the pouch, the top marginal portions of all the plies which are to form the respective side walls of the pouch.

2. The method of manufacturing multi-ply pouch forming stock in which an inner ply of the pouch is heat sealable plastic film free of adherence to a flexible outer ply between marginal portions of the pouch, which comprises heat sealing sheets of said plies together by heat sealing rolls along spaced apart band portions which are to provide the top of the pouch while leaving said sheets substantially free of adherence between said secured band portions, and subsequently winding the thus secured sheets into a roll for use in subsequently forming the pouch with such band portions extending transversely with respect to the axis of said roll.

3. The method of manufacturing multi-ply pouch forming stock in which an inner ply of the pouch is heat sealable plastic film free of adherence to a flexible outer ply between marginal portions of the pouch, heat sealing sheets of said plies together by heat sealing rolls along opposite side edge band portions and along at least one intermediate band portion extending longitudinally of the sheets between said side edge band portions while leaving said sheets substantially free of adherence between such secured portions, after such sealing slitting said intermediate band longitudinally along the length thereof to provide a plurality of independent multi-ply sheets heat sealed along opposite side margins, and winding each of said multi-ply sheets into a roll for use in subsequently forming the pouch with such band portions extending transversely with respect to the axis of said roll.

4. The method of manufacturing multi-ply pouches in which an inner flexible heat sealable ply of the pouch is free of adherence to an outer flexible ply between marginal portions of the pouch, which comprises continuously unwinding sheets of said plies from rolls thereof and moving them in one general direction, continuously heat sealing said sheets together along longitudinally extending spaced apart band portions which are to provide the top of the pouch while leaving said sheets substantially free of adherence between said band portions, and subsequently winding the thus secured sheets into a roll for use in subsequently forming the pouch; and forming said pouches by unwinding the thus secured sheets from said roll, folding them upwardly along a longitudinally extending line between said heat sealed band portions whereby said band portions are at the top, and heat sealing and cutting said sheets at selected spaced apart locations extending transversely to the fold line, to provide pouches with individual heat sealed side margins and open tops wherein the top marginal portions of all the plies forming the respective side walls of the pouch are heat sealed together prior to filling of product into the pouch.

5. The method of claim 4 wherein said band portions comprise opposite side edge portions of the sheets, and at least one intermediate band extending longitudinally of the sheets between said side edge portions, and after such heat sealing said intermediate band is slit longitudinally along the length thereof to provide a plurality of independent multiply sheets heat sealed along opposite side margins.

6. The method of manufacturing multi-ply pouches from a roll of laminated sheet material in which an inner flexible ply is bonded to an outer flexible ply along marginal band portions of the laminated sheet extending transversely with respect to the axis of the roll with said plies substantially free of adherence between said marginal band portions, which comprises unwinding said laminated sheet from the roll, folding said laminated sheet upwardly along a medial zone between such bonded band portions to position said band portions at the top and provide pouch forming multi-ply side walls with closed edges between the plies of each wall at the top, bonding and cutting said folded laminated sheet at selected spaced apart locations extending transversely with respect to the fold zone to form pouches with individual closed side margins and open tops between the multi-ply side walls.

7. The method of manufacturing multi-ply pouches which comprises providing a roll of laminated sheet material in which an inner heat sealable flexible plastic ply is heat sealed to an outer flexible ply along substantially continuous marginal band portions of the laminated sheet located at the respective ends of the roll and which extend transversely with respect to the axis of the roll with said plies substantially free of adherence between said marginal band portions, unwinding said laminated sheet from the roll and moving it one general direction, while thus being moved folding said laminated sheet upwardly along a medial zone between said heat sealed band portions to position said band portions at the top and provide pouch forming multi-ply side walls with closed edges between the plies of each wall at the top, heat sealing and cutting said folded laminated sheet at selected spaced apart locations extending transversely with respect to the fold zone to form pouches with individual closed side margins and open tops between the multi-ply side walls.

(References on following page)

References Cited by the Examiner

UNITED STATES PATENTS

| | | | |
|---|---|---|---|
| 1,993,394 | 3/1935 | Bangs et al. | 229—55 X |
| 2,333,587 | 11/1943 | Salfisberg | 229—55 |
| 2,344,369 | 3/1944 | Salfisberg | 229—55 |
| 2,749,817 | 6/1956 | Piazze et al. | 93—8 |
| 2,759,524 | 8/1956 | Davis | 156—271 |
| 2,805,973 | 9/1957 | Kalsing et al. | 156—271 |
| 3,016,806 | 1/1962 | Schoen et al. | 93—35 |
| 3,044,369 | 7/1962 | Ross | 93—35 |

BERNARD STICKNEY, *Primary Examiner.*

EARL M. BERGERT, D. J. DRUMMOND,
*Assistant Examiners.*